United States Patent
Borgström et al.

(10) Patent No.: US 6,751,951 B2
(45) Date of Patent: Jun. 22, 2004

(54) METHOD AND PLANT FOR CLEANING OF GASES FROM A COMBUSTION ENGINE (75) Inventors: Leonard Borgström, Tyresö (SE); Claes Göran Carlsson, Tullinge (SE); Peter Franzén, Tullinge (SE); Claes Inge, Saötsjö-Duvnäs (SE); Torgny Lagerstedt, Stockholm (SE); Hans Moberg, Stockholm (SE); Stefan Szepessy, Stockholm (SE); Tommy Myrvang, Stockholm (SE)

(73) Assignee: Alfa Laval AB, Tumba (SE)

( * ) Notice: Subject to any disclaimer, the term of this patent is extended or adjusted under 35 U.S.C. 154(b) by 0 days.

(21) Appl. No.: 10/339,274

(22) Filed: Jan. 9, 2003

(65) Prior Publication Data

US 2003/0097835 A1 May 29, 2003

Related U.S. Application Data (63) Continuation of application No. 09/674,193, filed on Dec. 4, 2000, now Pat. No. 6,536,211.

(30) Foreign Application Priority Data

May 4, 1998 (SE) ............................................... 9801567

(51) Int. Cl.[7] ................................................ F01N 3/02
(52) U.S. Cl. ....................................................... 60/311
(58) Field of Search ........................ 60/297, 311, 605.2; 55/404, 405, DIG. 30

(56) References Cited

U.S. PATENT DOCUMENTS

| | | | | |
|---|---|---|---|---|
| 1,950,586 A | | 3/1934 | Zubaty | |
| 3,236,045 A | * | 2/1966 | Berger et al. | 60/311 |
| 4,329,968 A | | 5/1982 | Ishikawa et al. | |
| 4,520,624 A | * | 6/1985 | Kiyota et al. | 60/311 |
| 4,589,254 A | * | 5/1986 | Kume et al. | 60/311 |
| 4,600,414 A | | 7/1986 | Metcalf et al. | |
| 4,832,709 A | * | 5/1989 | Nagyszalanczy | 55/404 |
| 4,840,645 A | * | 6/1989 | Woodworth et al. | 55/401 |
| 5,013,340 A | * | 5/1991 | Taslim et al. | 60/311 |
| 5,151,022 A | * | 9/1992 | Emerson et al. | 423/245.3 |
| 5,426,936 A | * | 6/1995 | Levendis et al. | 60/311 |
| 5,554,343 A | * | 9/1996 | Wade | 422/177 |
| 5,746,789 A | * | 5/1998 | Weight et al. | 55/306 |
| 5,779,618 A | * | 7/1998 | Onodera et al. | 494/5 |
| 5,903,060 A | | 5/1999 | Norton | |
| 5,924,534 A | | 7/1999 | Okubo | |

FOREIGN PATENT DOCUMENTS

| | | |
|---|---|---|
| DE | 35 41 204 | 5/1987 |
| DE | 3541204 | * 5/1987 |
| DE | 43 11 906 | 10/1994 |
| DE | 196 07 919 | 9/1997 |
| EP | 0 011 270 | 5/1980 |
| EP | 0 736 673 | 10/1996 |
| GB | 1 465 820 | 3/1977 |
| JP | 356050216 | 5/1981 |

\* cited by examiner

*Primary Examiner*—Thomas Denion
*Assistant Examiner*—Diem Tran
(74) *Attorney, Agent, or Firm*—McCormick, Paulding & Huber LLP (57) ABSTRACT

Gases produced by a combustion engine, e.g. crankcase gases, are conducted through a separation chamber formed and surrounded by a centrifugal rotor, by means of which the gases are caused to rotate, so that particles suspended in the gases are separated by means of centrifugal force. The centrifugal rotor is caused to rotate by means of a pressure fluid that is generated by means of the combustion engine.

31 Claims, 4 Drawing Sheets

METHOD AND PLANT FOR CLEANING OF GASES FROM A COMBUSTION ENGINE

CROSS REFERENCE TO OTHER APPLICATION

This application is a continuation of U.S. patent application Ser. No. 09/674,193, filed Dec. 4, 2000, now U.S. Pat. No. 6,536,211, the entire disclosure of which is incorporated herein by reference.

FIELD OF THE INVENTION

The present invention relates to cleaning of gases produced by a combustion engine from solid and/or liquid particles suspended therein. Gases of this kind are both combustion gases leaving the engine through its ordinary exhaust pipe and, for instance, so-called crankcase gases, i.e. combustion gases released through the crankcase of the engine, to which they have been pressed from the engine cylinders past the piston rings of the engine pistons.

BACKGROUND OF THE INVENTION

Crankcase gases have to be released so that they do not create an all too high gas pressure in the crankcase, and they contain in addition to combustion products, such as soot particles, also an amount of oil drops entrained from the oil mist having been formed and being present in the crankcase during the operation of the combustion engine.

For cleaning of gases of this kind various types of devices have been suggested previously, by means of which the gases may be brought into a rotational movement, so that the particles suspended in the gases may be separated by centrifugal force. Thus, it has been suggested that the gases should flow through a cyclone having one or more tangential inlets for the gases or flow through a chamber of a stationary housing, in which they are caused to rotate by means of a central driving wheel provided with wings or other entrainment members, e.g. as can be seen from U.S. Pat. No. 1,950,586 or DE 43 11 906 A1. Furthermore, it has been suggested that the gases should flow through channels or a separation chamber within a rotating member driven in one way or another by means of the combustion engine. According to one suggestion a rotating member of this kind would be driven by means of some rotating part of the combustion engine, as shown for instance in EP 0 736 673 A1, DE 196 07 919 A1 and U.S. Pat. No. 4,329,968. According to another suggestion the rotating member would be driven by means of kinetic energy of the gases which have been produced by the combustion engine and which are to be cleaned, as shown for instance in GB 1 465 820 and DE 35 41 204 A1.

The above-mentioned suggestions for cleaning of gases having been produced by a combustion engine each having one or more drawbacks. Thus, the suggestions based on the gases being caused to flow through a chamber formed by a stationary housing and being caused to rotate therein by means of a driving wheel or the like, which is provided with wings or similar entrainment members, have the disadvantage that a sufficiently effective separating operation is difficult or impossible to accomplish by means of this kind of technique. The suggestions being based on use of a rotatable member, which within itself forms a separation chamber through which the gases are to flow, have the disadvantage that the suggested methods of operating such a rotatable member either are difficult to use, if a very large rotational speed is desired for the rotating member, or put certain demands on the physical location of the rotatable member. It is often a desire that it should be possible to locate an equipment for cleaning of gases from a combustion engine at a desired place at or a distance from the combustion engine.

SUMMARY OF THE INVENTION

A starting point of the present invention for cleaning of gases of the kind here in question is the use of a rotatable centrifugal rotor, which forms and surrounds a separation chamber, through which the gases should be brought to flow. Only by means of a centrifugal rotor of this kind a sufficiently effective cleaning of the gases is achievable. An object of the invention is to accomplish driving of said centrifugal rotor in a way which enables, in a simple manner, both that a very high rotational speed can be achieved and that the centrifugal rotor can be located at a desired place near the combustion engine.

According to the invention it is proposed for the fulfillment of this object a method of cleaning gases, having been produced by a combustion engine, from solid and/or liquid particles suspended therein, which method thus takes as a starting point in that the gases are conducted through a separation chamber formed and surrounded by a rotating member, by means of which the gases are brought to rotate, so that the particles are separated from the gases in the separation chamber by means of centrifugal force, and which method is characterised in that the combustion engine is used to generate a pressure fluid other than that constituted by exhaust gases pressurised in the combustion room of the combustion engine, and that this pressure fluid is used for the driving of the rotating member.

By the method according to the invention it is achieved, firstly, that an effective centrifugal separator can be used, in which a centrifugal rotor can be driven by means of pressure fluid at a very high rotational speed and, secondly, that a centrifugal rotor of this kind—as a consequence of the fact that it is drivable by means of a pressure fluid which can be simply conducted to any desired place—can be arranged in a best possible space within or in the vicinity of the combustion engine.

Normally, a combustion engine pressurises for its own need fluids of different kinds. For instance fuel, lubricating oil and cooling water are pressurised. This is accomplished by means of pumps which in one way or another are operated by means of energy from the combustion engine. Furthermore, in certain cases the air, which has to be supplied to the combustion room of the engine, is pressurised by means of a compressor. Normally, this is driven by the exhaust gases leaving the combustion engine.

According to various modifications of the invention fluids having been pressurised in manners like this may be used for operation of the rotatable member in the aforementioned separator. The operation of the rotatable member may be accomplished by means of a turbine wheel or a similar member, which is connected—directly or through a gear device—with the rotatable member of the separator. An operation of this kind can be accomplished independently of whether the pressurised fluid is constituted by a liquid or a gas. The driving can be accomplished alternatively by means of a hydraulic or pneumatic motor of one kind or another.

One way of driving the rotatable member is to conduct all or part of the pressurised fluid into a rotatable housing, which is directly—or indirectly through a gear device—connected with the rotatable member, at least part of the fluid being caused to leave the housing through an outlet that is directed and placed such in relation to a rotational axis, around which the housing is rotatable, that the fluid leaving through the outlet will bring the housing and said rotatable member into rotation. This driving method can be used independently of whether the pressure fluid is constituted by a gas or a liquid.

Particularly in connection with diesel engines it is common that lubricating oil is cleaned by causing a part flow of the lubricating oil, which is pumped to relevant lubricating places in the engine, to pass through a so-called reaction-driven centrifugal separator. A centrifugal separator of this kind has a rotor, in which pressurised lubricating oil is introduced, one or several outlets for lubricating oil leaving the rotor being so placed and directed that the rotor, as a consequence of the outflow of lubricating oil, is brought into and kept in rotation. According to a particular application of the invention, a centrifugal separator of this kind for lubricating oil may be used for driving of the rotatable member in the aforementioned separator for cleaning of gases from the combustion engine. Thus, this rotating member may be carried by or be driven in some suitable way by the rotor in the centrifugal separator for lubricating oil.

It is of course possible within the scope of the present invention to use the combustion engine for pressurisation of a fluid, which is intended solely for the operation of said rotatable member or, at least, is not intended for any other need of the combustion engine. Thus, the combustion engine may be adapted for operation of an electric generator, electricity from this electric generator being used for pressurisation of a fluid. For instance, an electrically driven compressor for pressurisation of air, intended for operation of said rotatable member, may be coupled to an electric generator of this kind.

The invention also concerns a plant for performing the above described method of cleaning gases which have been produced by a combustion engine.

A plant of this kind comprises a centrifugal separator having a rotor, which is rotatable around a rotational axis and which delimits and surrounds a separation chamber, and gas conducting members for conducting said gases from the combustion engine into the rotor separation chamber, so that they are caused to rotate therein. The plant is characterised in that the combustion engine is adapted for operation of a pressurisation device for generating a pressure fluid other than that constituted by exhaust gases pressurised in the combustion room of the combustion engine, that the centrifugal separator has a driving device for said rotor, which driving device is adapted to cause rotation of the rotor by means of a pressure fluid, and that pressure fluid conducting members are adapted to conduct pressure fluid from said pressurising device to said driving device for rotation of the rotor.

BRIEF DESCRIPTION OF THE DRAWINGS

Various embodiments of a plant according to the invention are described in the following with reference to the accompanying drawings.

The FIGS. 1–4 show schematically a combustion engine and a centrifugal separator for cleaning of so-called crankcase gases leaving the combustion engine, and illustrate various drive sources for driving of a rotor in the centrifugal separator according to the invention.

The FIGS. 6 and 7 show schematically different further kinds of centrifugal separators for gas cleaning in accordance with the invention.

DETAILED DESCRIPTION OF THE PREFERRED EMBODIMENTS

Each one of the FIGS. 1–4 shows schematically a combustion engine 1 and a centrifugal separator 2 for cleaning of gases having been produced by the combustion engine 1. The engine 1 has four cylinders 3, which are charged with air through a conduit 4 and which emit combustion exhaust gases through an exhaust gas conduit 5. The supply of fuel to the cylinders 3 is not shown in the FIGS. 1–3, but is illustrated schematically in FIG. 4. The engine 1 further has a crankcase 6, which is partly filled with lubricating oil. Into this crankcase 6 come certain combustion gases, which pass the piston rings of the engine cylinders 3 and which have to be removed from the crankcase. Such so-called crankcase gases are conducted away through a conduit 7 opening into the centrifugal separator 2.

The exhaust gases leaving the cylinders 3 through the conduit 5 are further conducted through a so-called turbo unit 8, in which they are caused to drive a compressor 9 arranged for compression of air. Such air enters the compressor through an inlet conduit 10 and is pressed out of the compressor through an outlet conduit 11 into the aforementioned conduit 4 conducting the compressed air to the cylinders 3. A filter 12 is placed in the inlet conduit 10 for cleaning of incoming air. Crankcase gases having been cleaned from particles in the centrifugal separator 2 enter the inlet conduit 10 for air through a conduit 13, which is connected downstream of the filter 12.

Figure 1:
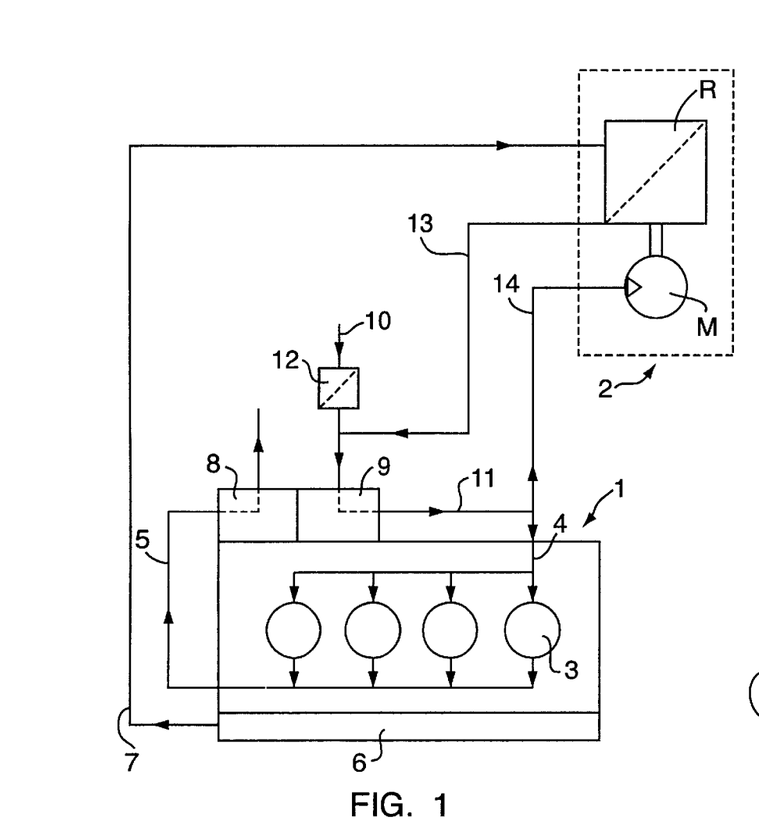

FIG. 1 shows a plant, in which the centrifugal separator 2 is driven by means of part of the pressurised air having been generated by the compressor 9. Thus, a driving air conduit 14, which opens into the centrifugal separator 2, starts from the compressor outlet conduit 11.

Figure 2:
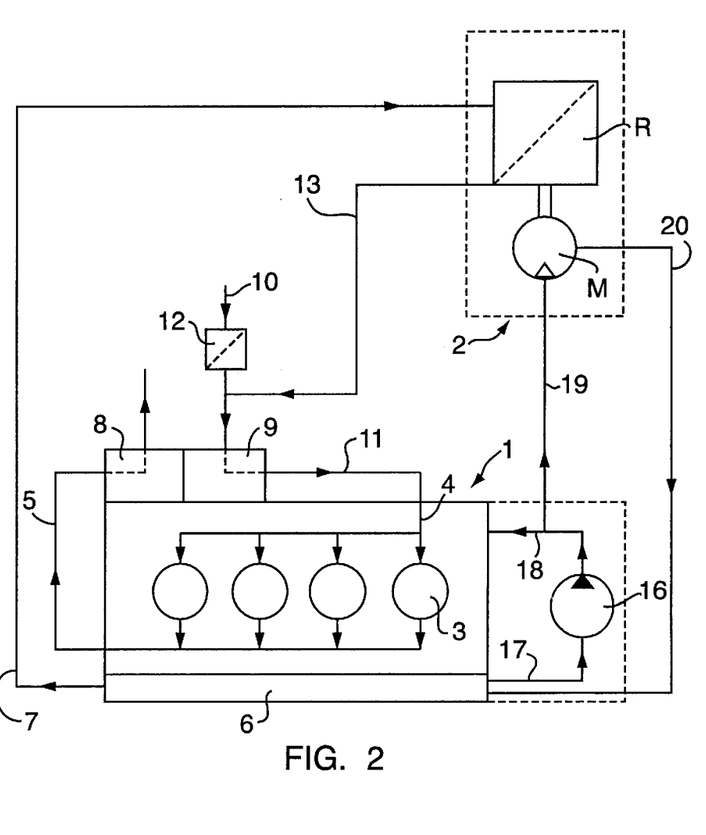

FIG. 2 shows a plant, in which the centrifugal separator 2 is driven by means of pressurised lubricating oil. Thus, there is shown a lubricating oil pump 16, which is charged with lubricating oil from the crankcase 6 through a conduit 17 and which pumps lubricating oil of this kind both through a conduit 18 to various lubricating places in the combustion engine 1 and through a conduit 19 to the centrifugal separator 2 for its operation. Through a conduit 20 lubricating oil from the centrifugal separator 2 is returned to the crankcase 6.

Figure 3:
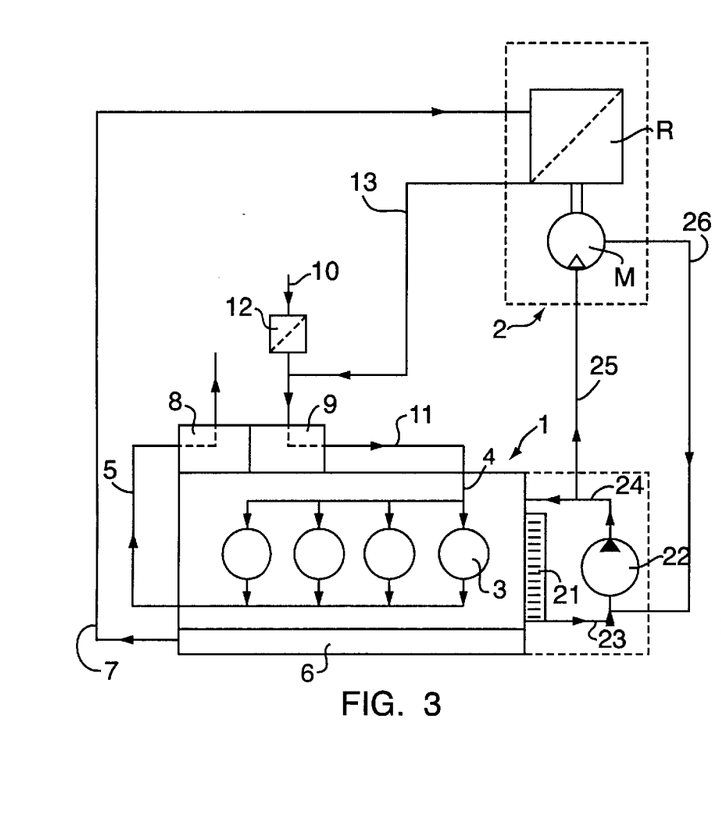

FIG. 3 shows a plant, in which the centrifugal separator 2 is driven by means of pressurised cooling water. Thus, a cooling unit 21, which is adapted to be flowed through by cooling water for the cooling thereof, is schematically shown. A water pump 22 is adapted to be charged with cooled water from the cooling unit 21 through a conduit 23 and to pump this water through a conduit 24 to different cooling places within the engine 1. Through not shown channels in the engine 1 the cooling water is then returned to the cooling unit 21. Through a conduit 25, starting from the conduit 24, part of the cooling water is also pumped to the centrifugal separator 2 for the operation of the latter. Cooling water of this kind is returned to the suction side of the pump 22 through a conduit 26.

Figure 4:
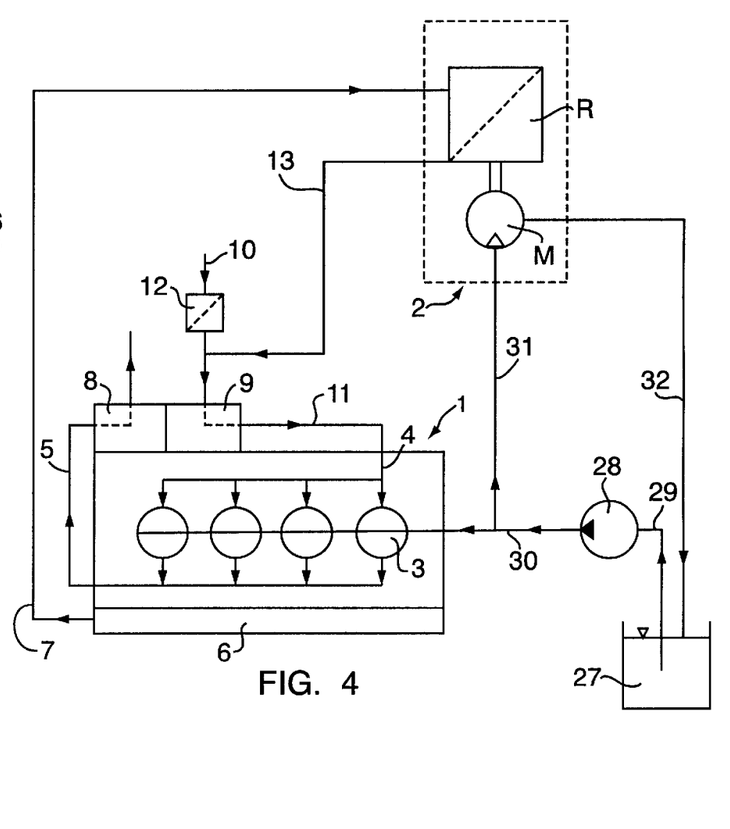

FIG. 4 shows a plant, in which the centrifugal separator is driven by means of pressurised fuel, e.g. fuel oil, intended for the operation of the engine. Thus, there is shown schematically a fuel tank 27, from which a fuel pump 28 is charged with fuel through a conduit 29 and pumps it further on through a conduit 30 to the engine 1. Through a branch conduit 31 of the conduit 30 part of the fuel is pumped to the centrifugal separator 2 for its operation. Fuel of this kind is returned through a conduit 32 to the fuel tank 27.

In each one of the plants according to the FIGS. 1–4 the centrifugal separator is adapted to be driven by means of a pressure fluid, the pressure of which has been generated by means of the combustion engine 1. The pumps 16, 22 and 28 are, thus, adapted to be driven in one way or another by the combustion engine 1. The driving device then used for the operation of the centrifugal separator may be of any suitable kind. Thus, for instance some kind of a hydraulic or pneumatic rotational motor may be chosen. Alternatively, a turbine wheel may be adapted to be rotated by the pressure fluid and be connected, or coupled through a gear device, to the rotor of the centrifugal separator. Alternatively, said rotor may be driven by a reaction force generated when the pressure fluid leaves a rotatable body through suitably designed outlet nozzles. In the FIGS. 1–4 the rotor of the centrifugal separator is designated R and the driving device or motor is designated M.

Figure 5:
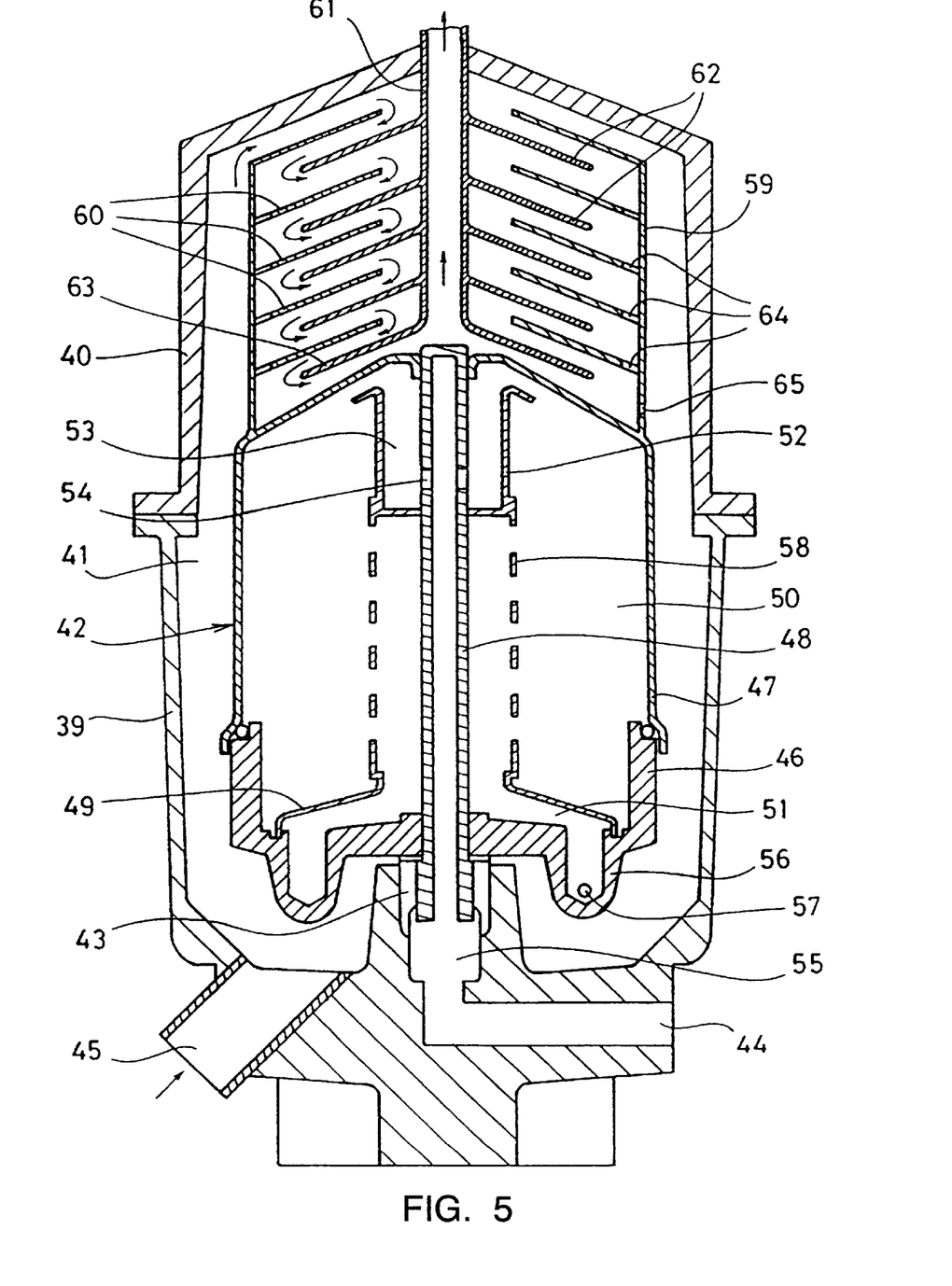
FIG. 5 shows a particular embodiment of a centrifugal separator for cleaning of gases coming from a combustion engine, combined with a reaction-driven centrifugal separator for cleaning of lubricating oil.

FIG. 5 shows a particular embodiment of a centrifugal separator according to the invention and, likewise particular, a driving device for the rotor of the centrifugal separator.

The apparatus in FIG. 5 comprises a stationary housing consisting of a lower housing part 39 and an upper housing part 40. Within the housing there is deliminated a chamber 41, in which there is arranged a rotor 42. The rotor is journalled at 43 in the lower housing part 39, so that it is rotatable around a vertical rotational axis.

The rotor 42 is adapted both for cleaning of lubricating oil, intended for lubrication of the combustion engine 1 according to FIG. 2, and for cleaning of crankcase gases coming from the same combustion engine 1 according to FIG. 2. The rotor 42 is adapted to be driven by means of the pressure of the lubricating oil being supplied from the lubricating oil pump 16 through the conduit 19 in FIG. 2. The conduit 19 opens into an inlet channel 44 in the lower housing part 39 in FIG. 5. Further, the lower housing part 39 in FIG. 5 receives through a gas inlet 45 crankcase gases supplied to the centrifugal separator through the conduit 7 in FIG. 2.

The rotor 42 in FIG. 5 includes a lower base plate 46 and a cover 47 placed thereon. The base plate 46 and the cover 47 surround a space intended to be filled and be flowed through by lubricating oil to be cleaned. An inlet pipe 48, which supports both the base plate 46 and the cover 47 and which is rotatably journalled in the lower housing part 39, extends centrally through the base plate 46 and the cover 47.

Within the rotor 42 the base plate 46 supports a frusto-conical partition 49, which divides the just mentioned space into a separation chamber 50 and an outlet chamber 51. The inlet pipe 48 carries a cylindrical sleeve 52, which between itself and the inlet pipe 48 delimits an inlet chamber 53. The inlet chamber 53 communicates at its lower part through a number of openings 54 with the interior of the inlet pipe 48 and at its upper part with the upper part of the separation chamber 50. The interior of the inlet pipe 48 communicates through a supply chamber 55 in the lower housing part 39 with the inlet channel 44 for lubricating oil to be cleaned.

The base plate 46 has on its underside two protuberances 56, the hollow interior of which communicates with the outlet chamber 51. In each protuberance 56 there is arranged an outlet nozzle 57, which is placed at a distance from the rotational axis of the rotor 42 and which is directed in the circumferential direction of the rotor.

A cylindrical filter 58 surrounding the inlet pipe 48 extends within the separation chamber 50 from the frusto-conical partition 49 to the cylindrical sleeve 52.

The part of the centrifugal separator in FIG. 5, which is intended for cleaning of lubricating oil, operates in the following manner.

Lubricating oil supplied by an overpressure through the channel 44 is conducted through the supply chamber 55 and the interior of the inlet pipe 48 into the inlet chamber 53. From there it is conducted further on through the separation chamber 50, through the filter 58 to the outlet chamber 51 and, from there, through the outlet nozzles 57 out of the rotor 42.

Leaving the rotor 42 the lubricating oil by a reaction force on the rotor brings this into rotation. This means that the lubricating oil flowing through the separation chamber 50 is subjected to centrifugal force, so that particles suspended in the lubricating oil and being heavier than that are separated and collected at the inside of the cover 47. The cleaned lubricating oil leaves, as said, the rotor 42 through the nozzles 57 and enters the chamber 41. From there the lubricating oil runs through the gas inlet 45 back to the crankcase of the combustion engine through the conduit 20 (see FIG. 2).

As can further be seen from FIG. 5, the cover 47 carries on its upper side a further separation device comprising a cylindrical surrounding wall 59 and several frusto-conical partitions 60, which are supported by said surrounding wall 59 spaced axially from each other and which are coaxial with the rotor 42. The surrounding wall 59 and the partitions 60, thus, are rotatable together with the cover 47 and constitute part of the rotor 42.

A central pipe 61, which is supported by the stationary upper housing part 40, extends downwardly centrally in the cylindrical surrounding wall 59. The pipe 61 supports axially separated conical partitions 62, which extend from the pipe 61 out into the interspaces between said frusto-conical partitions 60 supported by the surrounding wall 59. Hereby, there is between the rotatable surrounding wall 59 and its partitions 60, on one side, and the stationary central pipe 61 and its partitions 62, on the other side, a labyrinth path through the just described separation device from its upper to its lower part.

The central pipe 61 ends at its lower part in a funnel-formed partition 63, which is situated at some distance from the upper side of the cover 47. Thus, as is illustrated by means of arrows in FIG. 5, it is possible for crankcase gases entering the chamber 41 through the gas inlet 45 to flow into the upper separation device and through a labyrinth path to and out through the interior of the central pipe 61. While flowing through said labyrinth way the crankcase gases are brought into rotation as a consequence of the rotation of the surrounding wall 59 and the partitions 60. Hereby, solid particles and oil drops are separated by the centrifugal force from the crankcase gases, said particles and liquid drops depositing on the surrounding wall 59. Through holes 64 in the radially outermost parts of the partitions 60 and holes 65 in the lowermost part of the surrounding wall 59 separated liquid and entrained separated particles will leave the rotor 42 and, together with oil having been discharged out into the chamber 41 from the rotor 42 through the nozzles 57, flow back through the gas inlet 45 and the returning conduit 20 to the crankcase 6 of the combustion engine (see FIG. 2).

Cleaned crankcase gases leave through the central pipe 61 and are conducted through the conduit 13 (see FIG. 2) back to the combustion engine inlet for air. Alternatively, these gases may be released to the surroundings.

As explained, pressurised lubricating oil is used for driving of the gas separator in FIG. 5. However, of course a rotor designed as the upper part of the rotor 42, i.e. comprising the surrounding wall 59, the partitions 60 and a bottom wall similar to the uppermost part of the cover 47, may be driven in any one of the other ways to be seen from the FIGS. 1–4.

Figure 6:
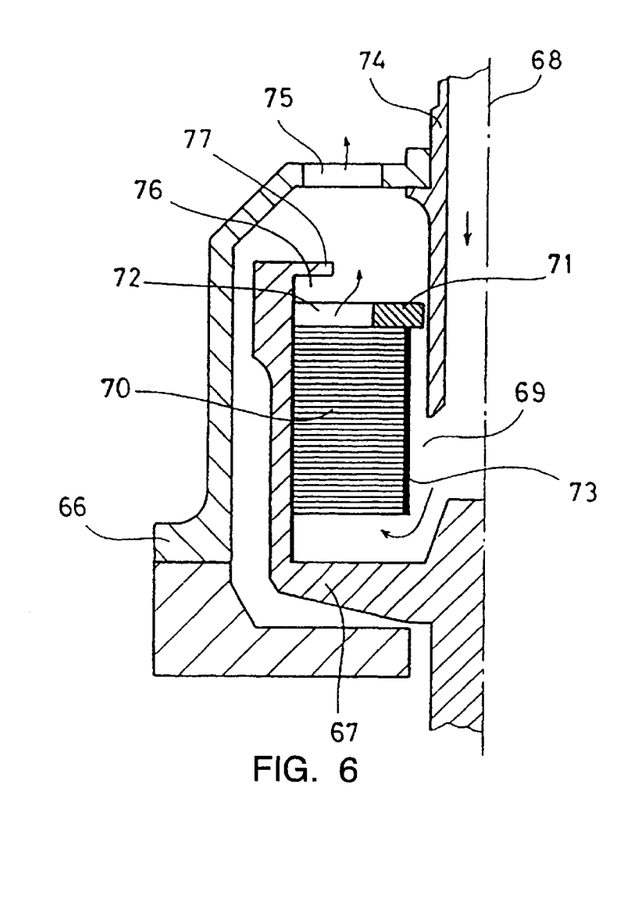

FIG. 6 shows a centrifugal separator of a different kind. A stationary housing 66, consisting of two parts, surrounds a rotor 67 that is rotatable around a rotational axis 68. The rotor 67 defines an annular separation chamber 69, in which there is arranged a likewise annular separation insert 70. This separation insert comprises an annular plate 71, which is supported on the inside of the surrounding wall of the rotor at the upper part thereof. The plate 71 has a number of through holes 72 distributed around the rotational axis 68.

Suspended from the underside of the plate 71, radially inside the holes 72, is a cylindrical support 73, on the outside of which there are fastened a lot of bristles, which are illustrated by means of a lot of parallel lines. The bristles extend from the supporter 73 to or close to the surrounding wall of the rotor 67 substantially perpendicular to the rotational axis 68.

Centrally into the rotor 67 is extending from above an inlet pipe 74, which is supported by the stationary housing 66. In the upper limiting wall of the housing there are several outlet openings 75 distributed around the inlet pipe 74.

The rotor may be rotatable in any suitable way, e.g. some of those previously described with reference to the FIGS. 1–5.

A gas (or gases) to be cleaned from particles suspended therein and being heavier than the gas, is introduced into the rotor through the inlet pipe 74 and may flow to the lower part of the separation chamber 69. From there the gas is conducted vertically upwardly, with reference to FIG. 6, through the part of the separation chamber 69 in which there are bristles. By the bristles the gas is entrained in their rotation, the heavy particles being separated from the gas, which continues upwardly and out of the rotor 67 through the holes 72 and further out of the housing 66 through the outlet openings 75.

The particles separated from the gases, which may be solids or liquid drops, move towards the surrounding wall of the rotor 67 between the bristles. Certain particles, maybe most of them, will then be brought into contact with the bristles and will slide along them by the centrifugal force towards said surrounding wall. Like the surrounding wall 59 of the rotor in FIG. 5 the surrounding wall of the rotor in FIG. 6 may be provided with small outlet holes for continuous discharge of separated particles to the space between the rotor 67 and the housing 66. Above all, if the particles are in the form of liquid drops, such a continuous discharge of separation products is suitable.

As an alternative to one or more holes through the surrounding wall of the rotor 67 may serve for continuous discharge of separated liquid from the rotor a stationary outlet device, which is adapted to discharge liquid during the rotation of the rotor at a certain distance from the rotational axis 68. A stationary outlet device of this kind may comprise a so-called paring pipe, which extends from above into the upper part of the rotor and opens at 76 in the vicinity of the rotor surrounding wall axially between the outlet holes 72 and an internal flange 77 of said surrounding wall. If there are no outlet holes through the surrounding wall of the rotor or some other arrangement for discharge of material separated from the gases, the rotor 67 has to be stopped and cleaned at certain time intervals.

Figure 7:
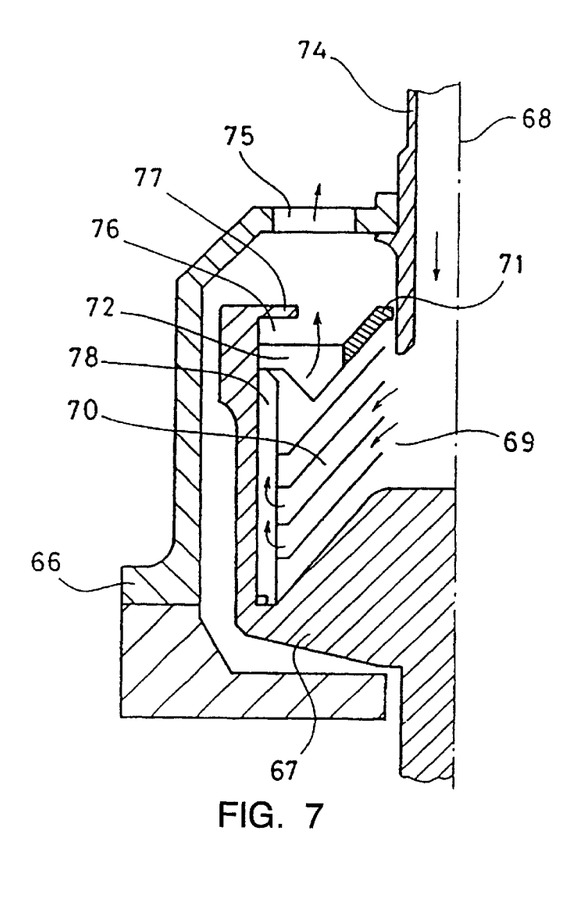

FIG. 7 shows a further embodiment of a centrifugal separator for cleaning of a gas from particles suspended therein and being heavier than the gas. The centrifugal separator in FIG. 7 is similar to the centrifugal separator in FIG. 6 and corresponding parts of these centrifugal separators have therefore been given the same reference numerals 66–72 and 74–77.

The separation insert 70 in FIG. 7 comprises several frusto-conical separation discs, which are placed in the separation chamber 69 coaxially with each other and at some axial distance from each other. Hereby, thin flow paths are formed between the separation discs from the radially inner edges to their radially outer edges. As can be seen from FIG. 7, the separation discs are kept radially spaced from the surrounding wall of the rotor 67 by means of an axial rib 78. Several ribs of this kind are arranged spaced from each other around the separation insert 70. The purpose of them is both to keep the conical separation discs in correct positions in the chamber 69 and to create between the separation discs and the surrounding wall of the rotor axial flow parts for gas having been cleaned or gas which is to be cleaned from particles.

Also the rotor in FIG. 7 may be rotatable in any suitable way, for instance some of those previously described with reference to the FIGS. 1–5.

Gas (or gases) to be cleaned from particles suspended therein and being heavier than the gas, is introduced into the rotor 67 through the inlet pipe 74. From the central part of the rotor the gas is distributed and flows further on towards the surrounding wall of the rotor through the thin interspaces between the conical separation discs. In these interspaces the gas is brought into rotation by the separation discs and possible spacing members arranged therebetween, the particles being separated from the gas by being thrown by the centrifugal force towards the undersides of the conical separation discs. On these undersides the separate particles slide, or a liquid formed by separated liquid drops flows, further towards the surrounding wall of the rotor. On the inside of the surrounding wall of the rotor separated material is thus collected, from where it can be removed either intermittently, e.g. manually when the rotor has been stopped, or continuously by the rotor surrounding wall being provided with openings similar to the openings 65 of the surrounding wall 59 in FIG. 5. Alternatively, the centrifugal separator in FIG. 7 may be provided with a stationary outlet device for separated liquid of the kind previously described in connection with-the centrifugal separator in FIG. 6. If a paring tube is used, it is important that this is adjusted such that a free liquid surface is formed in the rotor radially outside the outer edges of the conical separation discs, so that cleaned gases may flow axially past these outer edges and leave the rotor through the holes 72. Otherwise, separate holes have to be formed in the separation discs, which creates unnecessary throughflow resistance for the cleaned gases.

In the centrifugal separators according to the FIGS. 6 and 7 it has been assumed that gas to be cleaned is introduced through the pipe 74 and that cleaned gas leaves through the openings 75, which are situated at a substantially larger distance from the rotor rotational axis than is the inlet tube 74. Hereby it is achieved that the rotor operates as a fan, which creates a certain underpressure in the inlet pipe 74. The gas to be cleaned then need not be pressurised in order to be able to flow through the rotor. At both centrifugal separators it is possible, however, to have the gas flowing in the opposite direction.

It has been suggested above that the centrifugal separator in FIG. 7 should be used for cleaning of gas or gases generated by a combustion engine. However, this kind of centrifugal separator may be used also for cleaning of any gas or any gases from solid or liquid particles suspended therein, which are heavier than the gas or gases, respectively.

Like in use in connection with cleaning of liquids the conical separation discs in this centrifugal separator may be provided with differently designed spacing members in the interspaces between the separation discs. A particularly advantageous design of spacing members of this kind is shown in WO 90/05028, which design may preferably be used also in connection with the centrifugal separator described here for cleaning of gases. One effect of spacing members formed in this way is that separated particles and/or liquid are collected along the spacing members on the undersides of the separation discs and then leave the spaces between the separation discs only in limited sectors distributed around the circumference of the separation discs. This makes it possible by means of the above described ribs 78, or other means, to delimit certain parts of the space between the separation discs and the surrounding wall of the rotor for flow of substantially only gas, whereas other parts are adapted to receive substantially only particles or liquid from the interspaces between the separation discs. In this way the risk can be reduced or avoided that gas which flows axially between the separation discs and the surrounding wall of the rotor should entrain out of the rotor particles having previously been separated from the gas in the spaces between the separation discs.

What is claimed is:

1. A method of cleaning a stream of gases, which have been produced by a combustion engine, from at least one of solid and liquid particles suspended therein, the gases being conducted through a separation chamber formed and surrounded by a rotating member, by means of which the gases are caused to rotate, so that particles in the separation chamber are separated from the gases by means of centrifugal force, comprising:

using the combustion engine to generate a pressurized fluid other than that constituted by exhaust gases pressurized in the combustion chamber of the combustion engine, and causing a stream of the pressurized fluid other than said stream of gases to be cleaned to drive the rotating member.

2. A method according to claim 1, including the step of generating pressurized air as said pressurized fluid.

3. A method according to claim 2, including the further steps of supplying a first part of the pressurized air to the combustion chamber of the combustion engine, and utilizing a second part of the pressurized air to drive the rotating member.

4. A method according to claim 2, wherein the step of using the combustion engine to generate the pressurized fluid comprises the steps of:

supplying a compressor adapted to pressurize the air to be used as said pressurized fluid; and using exhaust gases from said combustion engine to drive said compressor.

5. A method according to claim 1, further including the step of supplying a pump; and wherein the step of using the combustion engine to generate the pressurized fluid comprises the step of:

employing the combustion engine to drive said pump for pressurizing the fluid to be used as said pressurized fluid.

6. A method according to claim 5, wherein said pressurized fluid is a pressurized liquid fuel and said method includes the steps of supplying a first part of said pressurized liquid fuel to the combustion chamber of the combustion engine by means of said pump, and using a second part of the pressurized liquid fuel to drive the rotating member.

7. A method according to claim 5, in which the pressurized fluid is a lubricating oil intended for the combustion engine, wherein said lubricating oil is pressurized by the steps of:

presenting the lubricating oil to said pump;

employing the pump to pressurize the lubricating oil; and using at least part of the lubricating oil pressurized by the pump to drive said rotating member.

8. A method according to claim 5, in which the pressurized fluid is a cooling water intended for the combustion engine, wherein said cooling water is pressurized by the steps of:

presenting the cooling water to said pump;

employing the pump to pressurize the cooling water; and using at least part of the cooling water pressurized by the pump to drive the rotating member.

9. A method according to claim 1, in which the step of causing said pressurized fluid to drive the rotating member includes supplying said pressurized fluid to a chamber in a rotatable housing connected with said rotating member, at least a part of the pressurized fluid being caused to leave the housing through an outlet which is so directed and placed in relation to a rotational axis around which the housing is rotatable that the pressurized fluid flowing out through the outlet keeps the housing and the rotating member in rotation.

10. A method according to claim 9, in which lubricating oil intended for lubricating the combustion engine is utilized as said pressurized fluid, said method including the further step of removing particles suspended in said lubricating oil by means of centrifugal force resulting from the rotation of the housing.

11. A method according to claim 1, including the step of conducting the gases to be cleaned from a crankcase in the combustion engine through said separation chamber in the rotating member.

12. A method according to claim 5, further including the steps of:

supplying a turbine wheel drivingly connected or coupled to the rotating member; and causing said pressurized fluid to actuate said turbine wheel for driving the rotating member.

13. A method according to claim 12 including the further step of using a liquid to actuate said turbine wheel for driving the rotating member.

14. A plant for cleaning of gases produced by a combustion engine from at least one of solid and liquid particles suspended therein, comprising:

a centrifugal separator having a rotor which is rotatable around a rotational axis and which delimits and surrounds a separation chamber, and gas conducting members for conducting said gases from the combustion engine into the separation chamber of the rotor, so that the gases are brought into rotation therein, a fluid pressurization device, the combustion engine being adapted for operating said pressurization device for generating a pressurized fluid other than that constituted by exhaust gases which have been pressurized in the combustion chamber of the combustion engine, the centrifugal separator having a driving device for said rotor, which driving device is adapted to bring the rotor in rotation by means of at least a part of the pressurized fluid, and pressurized fluid conducting members adapted to conduct pressurized fluid from said pressurization device to said driving device for rotation of the rotor.

15. A plant according to claim 14, in which said gas conducting members are adapted to conduct gases from a crankcase of the combustion engine to the separation chamber of the rotor.

16. A plant according to claim 14, in which said pressurization device includes a compressor for compression of air.

17. A plant according to claim 14, in which said pressurization device includes a pump adapted for pressurizing liquid.

18. A plant according to claim 14, in which said driving device comprises a housing which is rotatable around a rotational axis and has an inlet for said pressurized fluid and at least one outlet situated at a distance from the rotational axis and directed in a way such that fluid flowing out therethrough will cause the housing to rotate.

19. A plant according to claim 18, in which the rotor is carried by said rotatable housing.

20. A plant according to claim 19, in which said pump is adapted to pump lubricating oil intended for the combustion engine into the rotatable housing for cleaning of the lubricating oil and simultaneous driving of the rotor of the centrifugal separator intended for cleaning of said gases.

21. A plant according to claim 14, in which said separation chamber includes a stack of frusto-conical separation discs placed coaxially with the rotor and axially spaced from each other.

22. A plant according to claim 21, in which the rotor has a gas inlet and a gas outlet situated such that gases supplied to the rotor through the gas inlet are caused to flow through the spaces between the frusto-conical separation discs in a direction from the rotational axis of the rotor.

23. A method according to claim 5, including the step of generating a pressurized liquid as said pressurized fluid.

24. A plant according to claim 14 wherein said driving device includes a motor (M) having a turbine wheel that is coupled to said rotor (R) forming part of the centrifugal separator.

25. A plant according to claim 24, in which said pressurization device includes a pump that is operable to pressurize liquid.

26. A method of cleaning gases, which have been produced by a combustion engine, from at least one of solid and liquid particles suspended therein, the gases being conducted through a separation chamber formed and surrounded by a rotating member, by means of which the gases are caused to rotate, so that particles in the separation chamber are separated from the gases by means of centrifugal force, comprising the steps of:

supplying a pump;

employing the combustion engine to drive said pump;

presenting to said pump a lubricating oil intended for lubricating the combustion engine;

pumping the lubricating oil; and driving the rotating member with at least part of the pumped lubricating oil.

27. The method according to claim 26, including the step of conducting the gases to be cleaned from a crankcase in the combustion engine through the separation chamber in the rotating member.

28. A method of cleaning gases, which have been produced by a combustion engine, from at least one of solid and liquid particles suspended therein, the gases being conducted through a separation chamber formed and surrounded by a rotating member, by means of which the gases are caused to rotate, so that particles in the separation chamber are separated from the gases by means of centrifugal force, comprising the steps of:

supplying a pump;

employing the combustion engine to drive said pump;

presenting to said pump a cooling liquid intended for cooling the combustion engine;

pumping the cooling liquid; and driving the rotating member with at least part of the pumped cooling liquid.

29. The method according to claim 28, including the step of conducting the gases to be cleaned from a crankcase in the combustion engine through the separation chamber in the rotating member.

30. A method of cleaning gases, which have been produced by a combustion engine, from at least one of solid and liquid particles suspended therein, the gases being conducted through a separation chamber formed and surrounded by a rotating member, by means of which the gases are caused to rotate, so that particles in the separation chamber are separated from the gases by means of centrifugal force, comprising the steps of:

supplying a compressor;

employing the combustion engine to drive said compressor;

presenting air to said compressor;

compressing the air; and driving the rotating member with at least part of the compressed air.

31. The method according to claim 30, including the step of conducting the gases to be cleaned from a crankcase in the combustion engine through the separation chamber in the rotating member.

* * * * *